United States Patent [19]

Erdelitsch et al.

[11] Patent Number: 4,857,815
[45] Date of Patent: Aug. 15, 1989

[54] SWITCH FOR ENERGIZING AN ELECTRIC MOTOR OF A WIPER SYSTEM

[75] Inventors: Herbert Erdelitsch; Otto Machalitzky; Josef-Elmar Prang, all of Bietigheim-Bissingen, Fed. Rep. of Germany

[73] Assignee: SWE Auto-Electric GmbH, Bietigheim-Bissingen, Fed. Rep. of Germany

[21] Appl. No.: 172,726

[22] PCT Filed: Jun. 5, 1987

[86] PCT No.: PCT/EP87/00298
§ 371 Date: Apr. 11, 1988
§ 102(e) Date: Apr. 11, 1988

[87] PCT Pub. No.: WO87/07567
PCT Pub. Date: Dec. 17, 1987

[30] Foreign Application Priority Data

Jun. 11, 1986 [DE] Fed. Rep. of Germany ....... 3619587

[51] Int. Cl.⁴ .............................. H02P 1/04
[52] U.S. Cl. .................... 318/443; 318/444; 318/466; 318/467; 200/61.54; 307/10.1
[58] Field of Search ................. 307/9, 10 R; 318/443-489, DIG. 2; 200/61.27, 61.54, 61.34, 61.35, 61.31; 15/250.16, 250.17, 250 C, 250.12, 250.13, 250.27

[56] References Cited

U.S. PATENT DOCUMENTS

| | | | |
|---|---|---|---|
| 3,593,090 | 7/1971 | Kearns | 318/466 X |
| 4,328,431 | 5/1982 | Usami | 307/10 R |
| 4,585,980 | 4/1986 | Gille et al. | 318/444 |
| 4,607,198 | 8/1986 | Tsunoda | 318/DIG. 2 X |
| 4,670,695 | 6/1987 | Licata et al. | 318/443 |
| 4,710,878 | 12/1987 | Iyoda | 318/DIG. 2 |

Primary Examiner—William M. Shoop, Jr.
Assistant Examiner—Paul Ip
Attorney, Agent, or Firm—Robert P. Seitter

[57] ABSTRACT

This invention relates to a switch for energizing an electric motor of a wiper system from a voltage source, which motor has a switching member to be changed over in several modes of continuous operation as well as in a mode of intermittment operation. The switching member has two bridging contacts of which the first one co-operates with stationary contacts on a first contact path and the second one with stationary contacts on a second contact path. Thereby in at least one switching position a further mode of operation of the wiper system may be switched on via the second bridging contact and the stationary contacts of the associated second contact path in addition to intermittent operation. The switch has thus a high operational reliability, because there is little risk for a simultaneous failure of a stationary contact associated to the same mode of operation on both contact paths.

13 Claims, 5 Drawing Sheets

| OPERATION OF STATIONARY CONTACTS AND TERMINALS | | | | |
|---|---|---|---|---|
| | SWITCH 10 | | SWITCH 20 | |
| POSITION | CONTACT PATH A | CONTACT PATH B | CONTACT PATH C | CONTACT PATH D |
| PARKING POSITION P | 53-53e | - | 53-53e | - |
| INTERMITTENT OPERATION I | 53-53e | I-53a | 53-53e | I-53a |
| TIP-WIPER OPERATION T | 53-53a | 53-53a | - | 53-53a |
| CONTINUOUS OPERATION D1 | 53-53a | 53-53a | 53-53a | 53-53a |
| CONTINUOUS OPERATION D2 | 53a-53b | - | - | 53a-53b |

SWITCH FOR ENERGIZING AN ELECTRIC MOTOR OF A WIPER SYSTEM

BACKGROUND OF THE INVENTION

This invention relates to a switch for energizing an electric motor of a wiper system.

A switch of this kind is known from practice. Starting from a parking position the switch is adjustable by turning a switch lever in three successive operating positions. The first operating position thereby corresponds to an intermittent mode of operation in which a wiping action with a low wiper speed interrupted by interval times is effected. The following operating position corresponds to a first mode of continuous operation, in which a continuously low wiper speed is effected and the then following position corresponds to a second mode of continuous operatio in which a continuously high wiper speed is effected. The stationary contacts associated with the two modes of continuous operation of this construction are arranged one behind the other on a first contact path, whereas the stationary contacts associated with the intermittent mode of operation are located on a second contact path positioned beside the first contact path. The stationary contacts on the first contact path can thereby be acted upon in pairs by a first bridging contact and the stationary contacts on the second contact path can be acted upon in pairs by a second bridging contact. A disadvantge of this switch is that upon a failure of a pair of stationary contacts or of a part of this pair the associated mode of operation can no longer be effected. It is true that a failure of this kind does not happen very frequently in practice, however recently switches have been increasingly required in which a failure of this kind is even less probable and which therefore have an increased operational reliability in comparison with customary switches.

SUMMARY OF THE INVENTION

It is an object of the present invention to create a switch of the initially mentioned kind having an increased operational reliability, in particular with regard to the possible failure of a pair of stationary contacts or a part thereof.

This object is solved by a switch including the feature of the characterizing part of claim 14. There is only little risk for a stationary contact associated to the same mode of operation to fail simultaneously on both contact paths.

This is why a very high operational reliability is ensured in a switch according to the invention.

By a development according to claim 15 the operational reliability is even improved, because the current load per stationary contact is reduced to a half, so that the service life of this embodiment is theoretically doubled.

The parallel circuit can constructively be realized by making the two bridging contacts conductive in the same operating position. If the switch, as is customary, has operating positions for continuous operation with low and high wiper speed it is recommended to provide the measure(s) according to the invention for the mode of operation with slow wiper speed, because according to experience this wiper speed is needed more frequently than high wiper speed.

If the switch also has a position for tip-wiper operation which, according to experience, is also frequently needed, it is recommended to provide the measure(s) according to the invention also for this mode of operation. If the position for tip-wiper operation is adjacent to the position for continuous operation with low wiper speed the same stationary contacts can be used.

By the measure according to claim 18 it is achieved that the electric motor is not switched off during changeover from low to high wiper speed and the windshield wiper/or wipers do not stop in the meantime. The operator is thus prevented from being irritated.

BRIEF DESCRIPTION OF THE DRAWING

The invention is described below in detail by way of the accompanying drawing, in which.

DETAILED DESCRIPTION OF A PREFERRED EMBODIMENT

Figure 1:
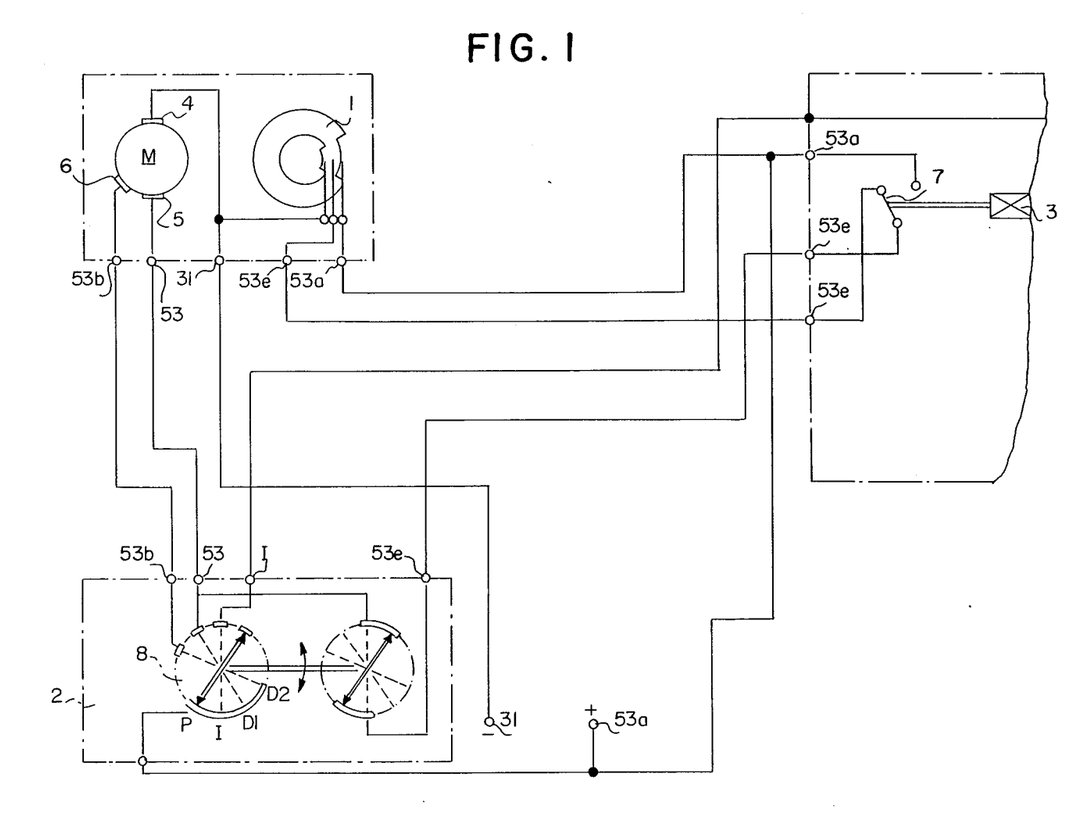
FIG. 1 is a diagram for energizing an electric motor of a wiper system according to the prior art.

The circuit diagram according to FIG. 1 shows an example of the prior art in which the electric motor of a wiper system for motor vehicles operating in the manner of a short-circuit motor is designated M, its parking position disk is designated 1 and its switch 2 and its relay 3. The negative pole of the voltage source is designated 31 and the positive pole of the voltage source 53a.

The electric motor M is in a known manner connected on a first brush 4 to the negative pole 31 of the voltage source via a terminal, which because of clarity is designated 31 just as the negative pole. It is also connected with its parking position disk 1 via the terminal 31. The parking position disk 1 may be connected in a known manner to the positive pole 53a of the voltage source via a terminal, which for clarity's sake is designated 53a just as the positive pole. The electric motor M is continuously connected with the relay 3 via a terminal of the parking position disk 1 designated 53e. The electric motor may furthermore be connected with the relay 3 by means of the parking position disk 1 via the terminal 53a.

The electric motor M is furthermore in a known manner connected on two further brushes 5 and 6 via two terminals 53 and 53b to two terminals of the switch 2, which terminals, for clarity's sake, have the same reference numerals as those of the electric motor M. Thereby a first mode of continuous operation D1 is associated to the terminals 53, wherein the wiper system is operated by the electric motor M with a low wiper speed. A second mode of continuous operation is associated with the terminals 53b, wherein the electric motor M operates the wiper system with a high wiper speed.

The switch 2 has a further terminal I via which it is connected in a known manner not shown in detail with the relay 3, which itself is coupled in a known manner with the terminal 53e of the switch 2 and the terminals 53a and 53e of the parking position disk 1 via a bridging contact 7 and is connected with electric components not shown and being operated in dependence of time. To the terminal I is associated an intermittent operation I of the electric motor M. In the mode of intermittent operation I the electric motor M operates the wiper system with low wiper speed, interrupted by time intervals.

The switch 2 is constructed in such a way that it can be manually switched on by an actuating member formed as a turning knob 8 starting from a parking position P successively into the modes of intermittent operation I, continuous operation D1 and continuous operation D2 after its rotation in anticlockwise direction.

The switch 2 thereby has a switching element not shown having two bridging contacts of which the first one co-operates with stationary contacts arranged on a first contact path, which stationary contacts are associated with the terminals 53a, 53b, 53 and I, 53e. The second bridging contact co-operates with stationary contacts 53 and 53e arranged on a second contact path extending in parallel or concentrically to the first contact path. Thus the mode of continuous operation D1 with low wiper speed and the mode of continuous operation D2 can be switched by means of the first bridging contact, whereas by means of the second bridging contact only the mode of intermittent operation I can be switched.

The switches 10 and 20 according to the invention (FIGS. 3 to 6) can be switched to a first mode of continuous operation D1 with low wiper speed, a second mode of continuous operation D2 with high wiper speed and a mode of intermittent operation I just as described above for the switch 2. The modes of operation mentioned may be selected in the switches in a known manner via locking positions of the switching member. In addition a mode of tip wiper operation T can also be switched in which the wipers are running with low wiper speed as long as the operating element is manually held in the position corresponding to the mode of tip-wiper operation T by the switches 10 and 20 according to the invention. In the mode of tip wiper operation T the actuating member does not occupy a locking position.

Like the switch 2, the switches 10 and 20 according to the invention also include two bridging contacts 30 and 40 or 50 and 60. The first bridging contact 30 or 50 co-operates with stationary contacts on a first contact path A or C. The modes of continuous operation D1, continuous operation D2 and tip-wiper operation T can be switched via the first bridging contact 30 or 50. The second bridging contact 40 or 60 co-operates with stationary contacts on the second contact path B or D. The intermittent operation I can be switched via the second bridging contact 40 or 60. However, according to the invention in at least one position in addition to the mode of intermittent operation I a mode of continuous operation, namely the mode of continuous operation D1 with low wiper speed, may be switched via the second bridging contact 40 or 60 and the stationary contacts of the associated second contact paths B or D. Thus, in comparison with the prior art, the switches 10 and 20 have a better operational reliability than the switch 2 included in the prior art. If a stationary contact of the switch 2 associated with the mode of continuous operation D1 fails, the mode of continuous operation D1 can no longer be switched. Due to the fact that, in the switches 10 and 20 according to the invention for switching the mode of continuous operation D1 stationary contacts of the second contact path B or D can also be used, this risk is considerably reduced. The risk of a simultaneous failure of an associated stationary contact on the first contact path A or C and on the second contact path B or D is unlikely.

In the switches 10 and 20 according to the invention, a first circuit between voltage source and electric motor is established via the first bridging contacts 30 and 50 and stationary contacts of the associated first contact paths A and C, by which the modes of continuous operation D1 and D2 of the wiper system may be switched. A parallel second circuit between voltage source and electric motor is established via the second bridging contacts 40 and 60 and stationary contacts of the associated second contact paths B and D when switched in the position for the mode of continuous operation D1. Thus in the mode of continuous operation D1 the current load per stationary contact is only half of the customary load, so that the service life of the stationary contacts acted upon in the mode of continuous operation D1 is theoretically twice as long as usual.

As far as design is concerned the parallel circuits are realized by applying voltage onto the two bridging contacts 30 and 40 or 50 and 60 in the mode of continuous operation.

Further details of a switch 10, shown in FIG. 2, according to the invention will be described below by way of FIGS. 2, 3, 4 and 7 of the drawing.

The switch 10 has two contact paths A and B on a plastic base plate 11. The contact paths A and B run concentrically with the point 12 on the base plate 11, about which the switching member 13, shown in FIG. 3, is rotatably mounted. The switching member 13 has two chambers 14 and 15 having the same length and receives two bridging contacts 30, 40 having the same length. The bridging contact 30 positioned in the chamber 15 has each of its ends divided or notched along its longitudinal center plane. Thus it has two contact points 31 and 32 or 33 and 34 on both of its ends. It could therefore be designated double bridging contact. Due to this design the operational reliabilty of the bridging contact 30 is high, because it is unlikely that both contact points 31 and 32 or 33 and 34 positioned on the same end will wear considerably at the same time. It has to be taken for granted that one of the contact points will be operatable for a longer time than the other one. Thus the service life of the bridging contact 30 is considerably increased in comparison with that of a customary bridging contact. The other bridging contact 40 is conventionally formed and has a contact point 41, 42 on both of its ends. For the present application this is sufficient, because—as described below—the bridging contact 30 has to perform less important functions than the bridging contact 30.

Starting from the parking position, the switch lever (which is not shown) rotates the switching member 13 of the switch 10 about the point 12 in a first direction successively into three different switching positions. The first position thereby effects the mode of tip-wiper operation T, the second one the mode of continuous operation D1 with slow wiper speed and the third one the mode of continuous operation D2 with fast wiper speed. Starting from the parking position P the switching element 13 can furthermore be brought into a position in which the mode of intermittent operation I is effected by a turn about the point 12 in a second direction.

Figure 2:
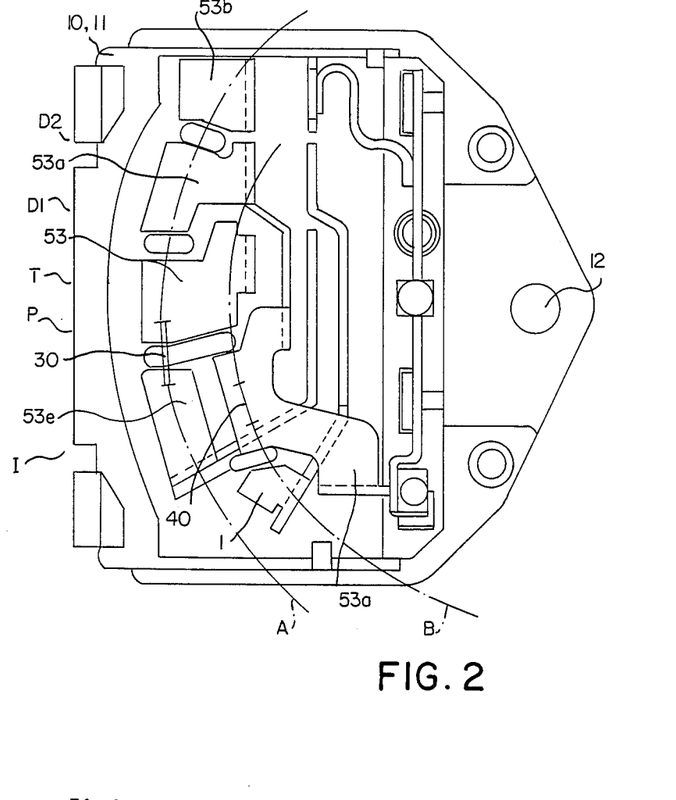
FIG. 2 is a view on the base plate of a first switch according to the invention.
Figure 3:
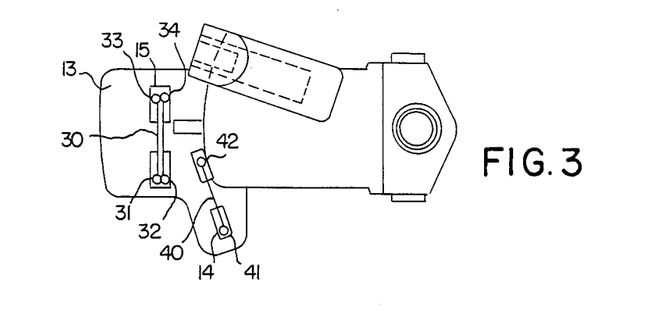
FIG. 3 is a top view on the switching element of a first switch according to the invention.
Figure 4A:
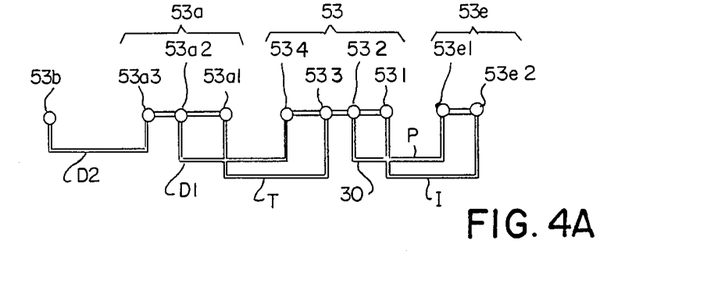
FIG. 4 is the contact scheme of a first switch according to the invention.
Figure 4B:
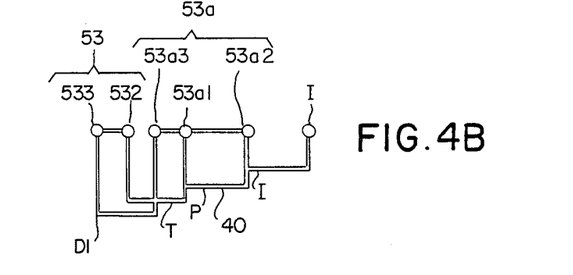

As FIGS. 2 and 4 show the switch 10 has four stationary contacts 53e, 53, 53a and 53b punched out from a sheet metal blank on the first outward contact path A, which stationary contacts are associated with the terminals 53e, 53, 53a and 53b and have ten contact points 53e2, 53e1, 531, 532, 533, 534, 53a1, 53a2, 53a3 and 53b. The contact point 53b is thereby part of the stationary contact 53b and thus of the terminal 53b. The contact points 53a3, 53a2 and 53a1 are part of the stationary contact 53a and thus of the terminal 53a. The contact points 534, 533, 532 and 531 are part of the stationary contact 53 and thus of the terminal 53. The contact points 53e2 and 53e1 are part of the stationary contact 53e and thus of the terminal 53e.

On the second, inner contact path B the switch 10 has three stationary contacts I, 53a and 53 associated to the Terminals I, 53a and 53 and six contact points I, 53a2, 53a1, 53a3, 532 and 533. The contact points 533 and 532 are part of the stationary contact 53 and thus of the terminal 53. The contact points 53a3, 53a1 and 53a2 are part of the stationary contact 53a and thus of the terminal 53a. The contact point I is part of the stationary contact I and thus part of terminal I.

Thus the stationary contacts 53 and 53a are available on both contact paths A and B. The stationary contact 53e is coupled with the parking position disk 1 (FIG. 1). The stationary contact 53 is connected with the brush 5 of the electric motor M effecting the mode of continuous operation D1 with low wiper speed. The stationary contact 53a is connected to the positive pole 53a of the voltage source. The stationary contact 53b is connected to the brush 6 of the electric motor M effecting the mode of continuous operation D2 with high wiper speed.

The contact points positioned on the first contact path A are spaced from each other in such a way that two successive ones each can be acted upon by the first bridging contact 30. The contact points positioned on the second contact path B are also spaced from each other in such a way that two successive ones each can be acted upon by the second bridging contact 40.

In the parking position P the first bridging contact 30 rests upon the contact point 53e1 of the stationary contacts 53e by means of the contact points 31 and 32 and upon the contact point 53a of the stationary contact 53 of the first, outer contact path A by means of the contact points 33 and 34, whereas the second bridging contact 40 rests upon the contact point 53a2 of the stationary contact 53a by means of the contact point 41 and on the contact point 53a1 of the stationary contact 53a of the second, inner contact path B by means of the contact point 42. The electric motor M is thus short-circuited and does not run.

In the position for intermittent operation I the first bridging contact 30 rests upon the contact point 531 of the stationary contact 53 by means of the contact points 31 and 32 and upon the contact point 53e2 of the stationary contacts 53e of the first outer contact path A by means of the contact points 33 and 34, whereas the second bridging contact 40 rests upon the contact point 53a2 of the stationary contact 53a by means of the contact point 41 and upon the contact point I of the stationary contact I of the second, inner contact path B by means of the contact point 42. Here the electric motor M is connected with the voltage source 31, 53a in an electrically conductive manner by means of the brush 5 both via the first bridging contact 30 and the second bridging contact 40 and via the relay 3. The electric motor M and the wipers thus run in the mode of intermittent operation with low wiper speed.

In the position for tip-wiper operation T the first bridging contact 30 rests upon the contact point 53a1 of the stationary contact 53a by means of the contact points 31 and 32 and upon the contact point 533 of the stationary contact 53 of the first, outer contact path A by means of the contact points 33 and 34, whereas the second bridging contact 40 with the contact point 41 rests upon the contact point 532 of the stationary contact 53 and upon the contact point 53a1 of the second, inner contact path B with the contact point 42. The electric motor M is thus connected in an electrically conductive manner with the voltage source 31, 53a by the brush 5 both via the first bridging contact 30 and via the second bridging contact 40. Here the electric motor M and the wipers thus are running in the mode of tip-wiper operation with low wiper speed until the switch lever and thus the switching element 13 is held in the position for tip-wiper-operation T.

In the switching position for continuous operation D1 with low wiper speed the first bridging contact 30 rests upon the contact point 53a2 of the stationary contacts 53a by means of the contact points 31 and 32 and upon the contact point 534 of the stationary contact 53 of the first, outer contact path A by means of the contact points 33 and 34, whereas the second bridging contact 40 rests upon the contact point 533 of the stationary contacts 53 by means of the contact point 41 and upon the contact point 53a3 of the stationary contact of the second, inner contact path B by means of the contact point 42. Just as in the position for tip-wiper operation T the electric motor M is connected with the voltage source 31, 53a in an electrically conductive manner both via the first bridging contact 30 and via the second bridging contact 40. Thus the electric motor M and the wiper are running in continuous operation D1 with slow wiper speed until the switching element 13 is located in the locking position for continuous operation D1.

In the switching position for continuous operation D2 with high wiper speed the bridging contact 30 rests upon the contact point 53b of the stationary contact 53b by means of the contact points 31 and 32 and upon the contact point 53a3 of the stationary contacts 53a by means of the contact points 33 and 34, whereas the bridging contact 40 rests upon the stationary contact 53a by means of the contact points 41 and 42. Thus in this case the electric motor M is only connected in an electrically conductive manner with the voltage source 31, 53a via the first bridging contact 30 on the brush 6. Thus a higher current flows than in the position for continuous operation D1 with low wiper speed. Thus the bridging contact 30 is heavily loaded. However its long service life is nevertheless ensured, because, as previously described, it is formed as a double bridging contact. The electric motor M and the wipers are running in continuous operation D2 with high wiper speed as long as the switching element 13 is positioned in the locking position for continuous operation D2. Thus altogether this switch 10 has a high operational reliability. The necessary plurality of contact points for ensuring the high operational reliability does not make the switch 10 more expensive in comparison with known switches, because the contact points with the contact paths A and B are arranged on a conductor blank injection-moulded around with plastic material.

Further details of the second switch 20 according to the invention are described below by way of FIGS. 5, 6 and 7 of the drawings.

Figure 5:
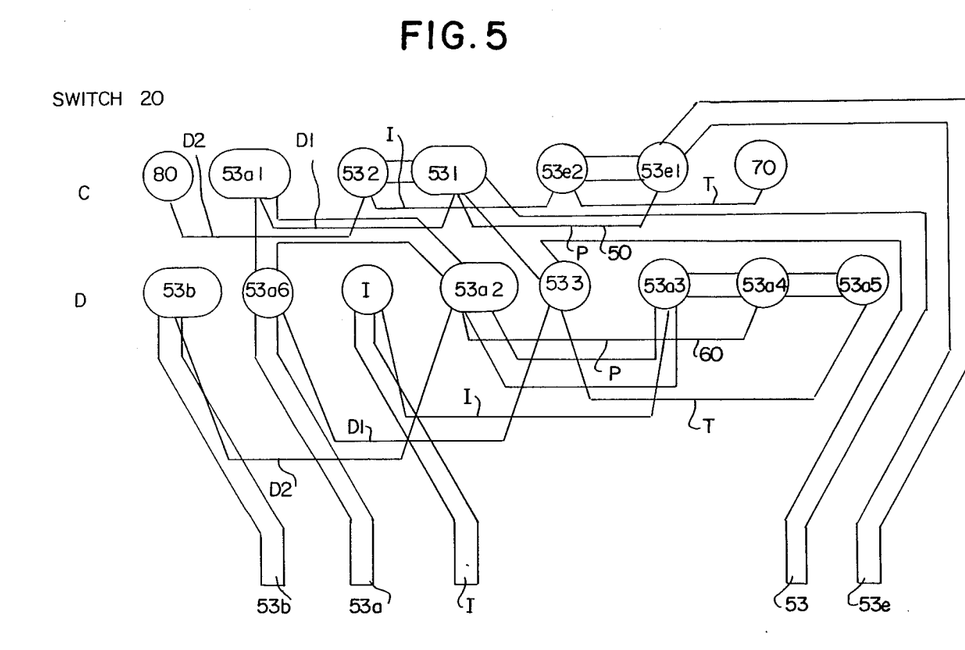
FIG. 5 is the contact and conductor scheme of a second switch according to the invention.

As FIG. 5 shows the switch 20 has seven contact points 70, 53e1, 53e2, 531, 532, 53a1 and 80 on the first contact path C. Thus the contact points 70 and 80 are not connected to the voltage source; but instead are vacant contacts. The contact points 53e1 and 53e2 are located on a stationary contact 53e formed as part of a conductor leading to the terminal 53e of the wiper system. The contacts 531 and 532 are positioned on a stationary contact formed as a metal conductor leading to the terminal 53 of the wiper system. The contact 53a1 thereby rests upon a stationary contact 53a formed as a metal conductor leading to terminal 53a of the wiper system. Thus, the contact points 531 and 53a1 are formed more longitudinally than the other contact points 70, 53e1, 53e2, 532 and 80.

On the second contact path D the switch 20 has eight contact points 53a5, 53a4, 53a3, 533, 53a2, I, 53a6 and 53b. The contact points 53a5, 53a4, 53a3, 53a2 and 53a6 are located on a stationary contact 53a formed as a metal conductor leading to terminal 53a of the wiper system. The contact point 533 is positioned on a stationary contact 53 formed as a metal conductor. The contact point I is positioned on a stationary contact I formed as a metal conductor leading to terminal I of the wiper system. The contact point 53b is positioned on a stationary contact formed as a metal conductor leading to terminal 53b of the wiper system. In this case the contact points 53a2 and 53b are formed more longitudinally than the other contact points 53a5, 53a4, 53a3, 533, I and 53a6.

The stationary contacts 53 and 53a are thus available on both contact paths C and D. The stationary contact 53e is coupled with the parking position disc 1 (FIG. 1). The stationary contact 53 is connecteed to the brush 5 of the electric motor M effecting continuous operation with low wiper speed. The stationary contact 53a is connected with the positive pole 53a of the voltage source. The stationary contact 53b is connected to the brush 6 of the electric motor M effecting continuous operation D2 with high wiper speed.

The first bridging contact 50 can thus act upon two contact points separated by a contact point and arranged on the first contact path C. The second bridging contact 60 is longer than the first bridging contact 50 and can act upon two contact points separated from each other by two contact points and arranged on the second contact path D.

Starting from a parking position the bridging contacts 50 and 60 can be successively brought into three different positions by displacing or turning a switching member not shown and a switch lever in a first direction. The first position effects intermittent operation I, the second one continuous operation D1 with low wiper speed and the third one the continuous operation D2 with high wiper speed. Furthermore the bridging contacts 50 and 60 can, by displacing or turning into a second direction, be brought into a position effecting tip-wiper operation T.

In the parking position P the first bridging contact 50 is centrally positioned on the second contact point 53e1 and on the right-hand half of the fourth contact point 531 of the first contact path C, whereas the second bridging contact 60 is centrally rested upon the second contact point 53e4 and at the left-hand half of the fifth contact point 53e2 of the second contact path D. Thus the electric motor is short-circuited and is not running.

In the switching position for tip-wiper operation T the first bridging contact 50 rests upon the first contact point 70 and the third contact point 53e2 of the first contact path C, whereas the second bridging contact 60 rests upon the first contact point 53a5 and upon the fourth contact point 533 of the second contact path D. In this case the electric motor M is connected in an electricaly conductive manner with the voltage source 31, 53a by the brush 5 via the second bridging contact 60. The electric motor M and the wipers are then running in tip-wiper operation with low wiper speed as long as the switch lever and thus the switching element is held in the position for tip-wiper operation T.

In the switching position for intermittent operation the first bridging contact 50 rests upon the third contact point 53e2 and upon the fifth contact point 532 of the first contact path C, whereas the second bridging contact 60 rests upon the third contact point 53a3 and the sixth contact point I of the second contact path D. In this case the electric motor M is connected with the voltage source 31, 53a in an electrically conductive manner by the brush 5. The electric motor M and the wipers are thus running in intermittent operation with low wiper speed.

In the position for continuous operation D1 with low wiper speed the first bridging contact 50 rests upon the right-hand half of the fourth contact point 531 and upon the left-hand half of the fourth contact point 53a1 of the first contac path C, whereas the second bridging contact 60 rests upon the fourth contact point 533 and upon the seventh contact point 53a6 of the second contact path D. Just as in the position for tip-wiper operation T the electric motor M is in this case connected with the voltage source 31 in an electrically conductive manner both via the first bridging contact 50 and via the second bridging contact 60. Thus in this case the electric motor M and the wipers are running in continuous operation D1 with low wiper speed as long as the switching member is held in the locking position for continuous operation D1.

In the switching position for continuous operation D2 with high wiper speed the first bridging contact 50 rests upon the fifth bridging contact 532 and upon the eighth contact point 80 of the first contact path C, whereas the second bridging contact 60 rests upon the left-hand half of the fifth contact point 53a2 and upon the left-hand half of the eighth contact point 53b. The electric motor M is thus connected with the voltage source 31, 53a by the brush 6 in an electrically conductive manner via the second bridging contact 60 only. Thus a higher current flows (via the second bridging contact) than in the position for continuous operation D1 with low wiper speed. On the one hand the electric motor M and the wipers are running in continuous operation D2 with high wiper speed, when the switching member is located in the position for continuous operation D2. On the other hand during a changeover from continuous operation D1 with low wiper speed into continuous operation D2 with high wiper speed they continue to run with low wiper speed, because the first bridging contact 50 still moves across the fourth contact point 531 and the sixth contact point 53a1 until the second bridging contact 60 touches the fifth contact point 53a2 and the eighth contact point 53b. This is so, because these contact points 531, 53a1, 53a2 and 53b, as previously described, are formed longitudinally and, in addition, as far as their position is concerned, are adapted to the lengths and the locking positions of the bridging contacts 50 and 60 in such a way that a contact covering is possible. Upon changeover from continuous operation D2 with high wiper speed into operation D1 with low wiper speed the electric motor M and the wipers continue to run with high wiper speed, because the second bridging contact 60 still moves across the eighth contact point 53b and the fifth contact point 53a2 until the first bridging contact 53a1 touches the sixth contact point 53a1 and the fourth contact point 531. Thus the current flow and the wiper operation are not interrupted upon a changeover from the switching position for the mode of continuous operation D1 with low wiper speed into the switching position for continuous operation D2 with fast wiper speed or vice versa, so that the operator of the wiper system will not be irritated. Furthermore the switching-on voltage for inducing the mode of continuous operation D2 with high wiper speed is lower than usual which fact has also a favourable effect on the service life of the switch.

This advantage is thereby economically realized, because the contact points are part of the terminals 53e, 53, I, 53a and 53b arranged on metal conductors on a blank injection-moulded around.

Figure 6:
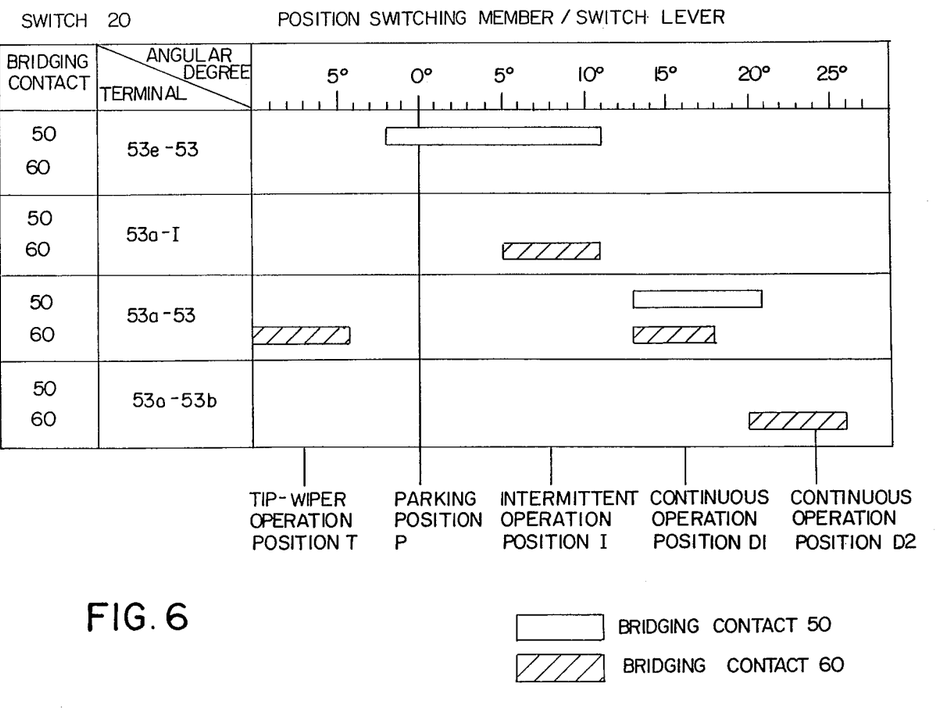
FIG. 6 is another representation of the contact scheme schown in FIG. 4
Figure 7:
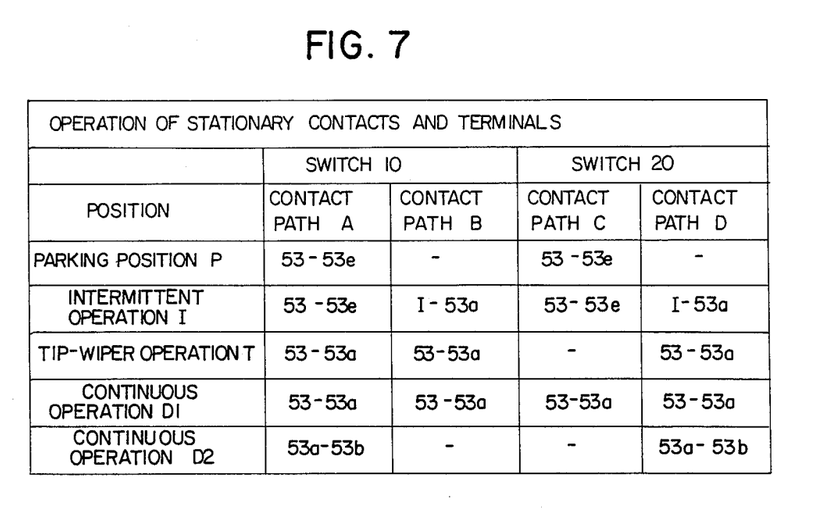
FIG. 7 is a comparison between terminals to be operated in the various switching positions by the two switches according to the invention.

From FIG. 6 can be seen which positions are occupied by the individual bridging contacts 50 and 60 during the changeover. As illustrated in line 3 of FIG. 6, for example, contact is established between stationary contacts 53 and 53a via the second bridging contact 60 upon rotation of the turning switch lever and switching member from the parking position P by 13 to 18 angular degrees.

What is claimed is:

1. An electric switch for energizing an electric motor of a windshield wiper system especially used for automotive vehicles having a voltage source, comprising a switching member with two bridging contacts and further comprising a plurality of stationary contacts arranged along two contact paths, said switch being manually adjustable into several switching positions for continuous operation and one position for intermittent operation of the windshield wiper system, a first one of said bridging contacts engaging stationary contacts on a first contact path and a second one of said bridging contacts engaging alternate stationary contacts on a second contact path, having at least one position of the switching member in which the first bridging contact energizes a mode of operation other than intermittent operation, and having at least one other position of the switching member in which the second bridging contact also energizes a mode of continuous operation.

2. The electric switch according to claim 1 further comprising a first circuit including the first bridging contact which selectively energizes continuous operation and also comprising a second circuit including the second bridging contact which, in at least one position of the switching member, also energizes continuous operation, the second circuit being parallel to the first circuit.

3. The electric switch according to claim 2 wherein the bridging and stationary contacts are arranged such that the switching member may be adjusted into a position for continuous operation with low wiper speed and into a position for continuous operation with high wiper speed, in which the parallel first and second circuits both energize continuous operation with low wiper speed.

4. The electric switch according to claim 2 wherein the bridging and stationary contacts are arranged such that the switching member may be adjusted into a position for tip-wiper operation of the windshield wiper system, in which the parallel first and second circuits both energize tip-wiper operation.

5. The electric switch according to claim 1 wherein the bridging and stationary contacts are arranged such that the switching element may be changed over into switching positions for continuous operation with low and high wiper speed, continuous operation with low wiper speed is energized via the first bridging contact and the stationary contacts of the associated first contact path and continuous operation with high wiper speed is energized via the second bridging contact and the stationary contacts of the associated second contact path, and such that a transitional switching member position is located between the switching position for continuous operation with low wiper speed and the switching position for continuous operation with high wiper speed, in which transitional position both bridging contacts simultaneously rest upon the stationary contacts for a short time.

6. The switch according to claim 4 wherein the bridging and stationary contacts are arranged such that starting from a parking position the switching member is in a first direction adjustable into an intermittent operation position and in a second direction is successively adjustable into a tip-wiper operation position, a first continuous operation position with low wiper speed and a second continuous operation position with high wiper speed, the contact paths running substantially concentrically and the first contact path comprising four consecutive stationary contacts of which a second and third stationary contacts have corresponding contacts on the second contact path, and of which stationary contacts any two successive contacts can be engaged by the first bridging contact in order to effect the operating positions, and of which four stationary contacts a first contact is electrically connected to a parking position disk via which it is selectively connected with a positive pole and with a negative pole of a voltage source supplying the electric motor, the second stationary contact being connected to a brush of the electric motor effecting continuous operation with low wiper speed, the third stationary contact being connected to the positive pole of the voltage source, and the fourth stationary contact being connected to a second brush of the electric motor effecting continuous operation with high wiper speed, the second contact path comprising three consecutive alternate stationary contacts of which a first alternate stationary contact is operatively connected with a timing element, a second alternate stationary contact corresponds to the third stationary contact of the first contact path and the third alternate stationary contact corresponds to the second stationary contact of the first contact path, and of which alternate stationary contacts any two successive contacts can be acted upon by the second bridging contact for effecting the operating positions.

7. The switch according to claim 6 wherein the bridging and stationary contacts are arranged such that in the parking position the first bridging contact rests upon the first stationary contact of the first contact path, which first stationary contact is not connected with the negative pole of the voltage source and which first bridging contact also rests upon the second stationary contact of the first contact path, whereas the second bridging contact rests upon the second alternate stationary contact of the second contact path, in the intermittent operation position the first bridging contact is connected with the first stationary contact of the first contact path which is connected with the negative pole of the voltage source and which first bridging contact also rests upon the second stationary contact of the first contact path, whereas the second bridging contact rests upon the first and second alternate stationary contacts of the second contact path, in the tip-wiper operation position and in the continuous operation position with low wiper speed the first bridging contact rests upon the second and third stationary contacts of the first contact path, whereas the second bridging contact rests upon the second and third alternate stationary contacts of the second contact path, and in the continuous operation position with high wiper speed the first bridging contact rests upon the third and fourth stationary contacts of the first contact path, whereas the second bridging contact rests upon the third alternate stationary contact of the second contact path.

8. The switch according to claim 5 wherein the bridging and stationary contacts are arranged such that, starting from a parking position, the switching member is adjustable into a tip-wiper operation position in a first direction and, in a second direction, successively into an intermittent operation position, a first continuous operation position with low wiper speed and a second continuous operation position with high wiper speed, the contact paths running substantially concentrically and the first contact path comprising seven consecutive contact points, of which a first and seventh points are vacant contact points, of which a second and third points are coupled with a parking position disk via which the points are selectively connected with a positive pole and a negative pole of a voltage source supplying the electric motor, of which a fourth and fifth points are connected to a brush of the electric motor effecting continuous operation with low wiper speed, of which a sixth point is connected to the positive pole of the voltage source and of which points any two separated by a single contact point can be simultaneously engaged by the first bridging contact in order to effect four operating positions, the second contact path comprising eight consecutive alternate contact points of which a first, second, third, fifth and seventh alternate points are connected to the positive pole of the voltage source, of which a fourth alternate point is connected to the brush of the electric motor effecting continuous operation with low wiper speed, of which a sixth alternate point is connected to a timing element, of which an eighth alternate point is connected to a second brush of the electric motor effecting continuous operation with high wiper speed and of which alternate points any two separated by two contact points can be simultaneously engaged by the second bridging contact for effecting five operating positions.

9. The switch according to claim 8 wherein the bridging and stationary contacts are arranged such that in the parking position the first bridging contact rests upon the second contact point of the first contact path which second contact point is not connected with the positive pole of the voltage source, and which first bridging contact also rests upon the fourth contact point of the first contact path, whereas the second bridging contact rests upon the second and fifth alternate contact points of the second contact path, in the tip-wiper operation position the first bridging contact rests upon the vacant first contact point and upon the third contact point of the first contact path, whereas the second bridging contact rests upon the first and fourth alternate contact points of the second contact path, in the intermittent operation position the first bridging contact rests upon the third contact point, which third contact point is connected with the positive pole of the voltage source, and which first bridging contact also rests upon the fifth contact point of the first contact path, whereas the second bridging contact rests upon the third and sixth alternate contact points of the second contact path, in continuous operation position with low wiper speed the first bridging contact rests upon the fourth and sixth contact points of the first contact path, whereas the second bridging contact rests upon the fourth and seventh alternate contact points of the second contact path, in a transitional position between the position of continuous operation with low wiper speed and the position of continuous operation with high wiper speed the first bridging contact rests upon the fourth and sixth contact points of the first contact path and the second bridging contact rests upon the fifth and eighth alternate contact points of the second contact path, and in continuous operation position with high wiper speed the first bridging contact rests upon the fifth contact point and the vacant seventh contact point of the first contact path, whereas the second bridging contact rests upon the fifth and eighth alternate contact points of the second contact path.

10. The switch according to claim 8 wherein the fourth contact point of the first contact path has a lengthening extending in the direction of the fifth contact point of the first contact path, the sixth contact point of the first contact path has a lengthening pointing toward the vacant seventh contact point of the first contact path, the fifth alternate contact point of the second contact path has a lengthening extending toward the fourth alternate contact point of the second contact path, and the eighth alternate contact point of the second contact path has a lengthening extending toward the seventh alternate contact point of the second contact path.

11. The switch according to claim 1 wherein at least one of the bridging contacts is formed as a double bridging contact.

12. The switch according to claim 1 wherein the stationary contacts and the contact paths are part of a conductor blank punched out from sheet metal.

13. The switch according to claim 12 wherein the stationary contacts and the contact paths are part of a conductor blank around which plastic material is injection-molded.

* * * * *